US010839632B2

(12) United States Patent
Gibson et al.

(10) Patent No.: US 10,839,632 B2
(45) Date of Patent: Nov. 17, 2020

(54) FRAMEWORKS AND METHODOLOGIES CONFIGURED TO PROVIDE ACCESS TO BUILDING DEVICES VIA DOMAIN CONCEPT ABSTRACTION

(71) Applicant: Honeywell International Inc., Morris Plains, NJ (US)

(72) Inventors: Adam Gibson, Sunnybank (AU); Ashley Noble, South Hobart (AU); Kendall Paix, Cherrybrook (AU)

(73) Assignee: Honeywell International Inc., Morris Plains, NJ (US)

( * ) Notice: Subject to any disclaimer, the term of this patent is extended or adjusted under 35 U.S.C. 154(b) by 0 days.

(21) Appl. No.: 15/751,428

(22) PCT Filed: Aug. 3, 2016

(86) PCT No.: PCT/US2016/045253
§ 371 (c)(1),
(2) Date: Feb. 8, 2018

(87) PCT Pub. No.: WO2017/027278
PCT Pub. Date: Feb. 16, 2017

(65) Prior Publication Data
US 2018/0357844 A1    Dec. 13, 2018

(30) Foreign Application Priority Data
Aug. 11, 2015  (AU) ................................ 2015903207

(51) Int. Cl.
*G07C 9/38*   (2020.01)
*G06F 16/903*  (2019.01)
(Continued)

(52) U.S. Cl.
CPC .............. *G07C 9/38* (2020.01); *G05B 15/02* (2013.01); *G06F 9/54* (2013.01); *G06F 16/903* (2019.01); *G05B 2219/2642* (2013.01)

(58) Field of Classification Search
CPC .... G06Q 10/00; G07C 9/00166; G05B 15/02; G05B 2219/2642; G06F 17/30964; G06F 9/54; G06F 16/903
(Continued)

(56) References Cited

U.S. PATENT DOCUMENTS 5,517,185 A    5/1996  Acimovic et al.
7,734,572 B2   6/2010  Wiemeyer et al.
(Continued)

FOREIGN PATENT DOCUMENTS

WO    2006065996 A2    6/2006

*Primary Examiner* — James J Yang
(74) *Attorney, Agent, or Firm* — Seager Tufte & Wickhem LLP

(57) ABSTRACT

The present invention relates to frameworks and methodologies configured to provide access to building devices via domain concept abstraction. Embodiments of the invention have been particularly developed to allow simplified centralised access to a wide range of building devices based on domain concept abstraction, hence isolating end users (and applications) from details as to specific attributes of individual building-level hardware devices. While some embodiments will be described herein with particular reference to that application, it will be appreciated that the invention is not limited to such a field of use, and is applicable in broader contexts.

11 Claims, 4 Drawing Sheets

(51) Int. Cl.
*G05B 15/02* (2006.01)
*G06F 9/54* (2006.01)

(58) Field of Classification Search
USPC .......................................... 340/5.2
See application file for complete search history.

(56) References Cited

U.S. PATENT DOCUMENTS

| | | | |
|---|---|---|---|
| 8,468,165 B2 * | 6/2013 | Walker | H04L 12/2809 |
| | | | 707/769 |
| 8,729,834 B1 * | 5/2014 | Funderburk | H05B 37/0245 |
| | | | 315/312 |
| 2011/0071685 A1 | 3/2011 | Huneycutt et al. | |
| 2013/0060357 A1 | 3/2013 | Li et al. | |
| 2013/0109406 A1 * | 5/2013 | Meador | H04W 4/33 |
| | | | 455/456.1 |
| 2013/0173062 A1 * | 7/2013 | Koenig-Richardson | |
| | | | G05B 15/02 |
| | | | 700/275 |

\* cited by examiner

FRAMEWORKS AND METHODOLOGIES CONFIGURED TO PROVIDE ACCESS TO BUILDING DEVICES VIA DOMAIN CONCEPT ABSTRACTION

This application is a National Stage of International Application No. PCT/US2016/045253, filed Aug. 3, 2016, which claims the benefit of Australian Patent Application No. 2015903207, filed Aug. 11, 2015, both of which are incorporated herein by reference.

FIELD OF THE INVENTION

The present invention relates to frameworks and methodologies configured to provide access to building devices via domain concept abstraction. Embodiments of the invention have been particularly developed to allow simplified centralised access to a wide range of building devices based on domain concept abstraction, hence isolating end users (and applications) from details as to specific attributes of individual building-level hardware devices. While some embodiments will be described herein with particular reference to that application, it will be appreciated that the invention is not limited to such a field of use, and is applicable in broader contexts.

BACKGROUND

Any discussion of the background art throughout the specification should in no way be considered as an admission that such art is widely known or forms part of common general knowledge in the field.

Modern buildings include a wide range of devices that are able to be accessed via a network. These include devices relevant to the likes of access control (e.g. doors), surveillance (e.g. cameras), lighting (e.g. light controllers), HVAC (e.g. AHUs) and so on. It is known to provide a Building Management System (BMS) to enable management of the various devices and their associated functions. However, costs of configuration, and complications brought about by a multitude of different device hardware/control configurations, provide limitations to what is able to be achieved via conventional BMS technology.

SUMMARY OF THE INVENTION

It is an object of the present invention to overcome or ameliorate at least one of the disadvantages of the prior art, or to provide a useful alternative.

One embodiment provides a computer implemented method for providing building management functionalities, the method including:

receiving, at a server device, data from a plurality of building network interface nodes, wherein each building network interface node is:

(i) connected to a respective network that includes one or more building devices, each device being configured to output point value data and/or accept control instructions;

(ii) configured to identify the connected one or more building devices;

(iii) configured to upload to the server point identity data for each of the one of the building devices;

(iv) configured to upload to the server point value data from at least one of the building devices; and (v) configured to provide to at least one of the building devices a control instruction received from the server;

for each of the building devices, defining a respective data set, wherein for a given device the data set includes device attributes that associate the device to one or more domain concepts;

providing an interface enables access to point value data based on a domain concept specific query and/or defining of control instructions based on a domain concept specific query.

One embodiment provides a device network interface node device including:

a network module that is configured to connect to a control network, wherein the device is configured to identify, on the control network, one or more connected building devices wherein the device is configured to output point value data and/or accept control instructions;

a processor that is configured to process the point value data, thereby to enable a server device to make domain concept level normalised point value data available via an interface, wherein the interface enables access to point value data based on a domain concept specific query and/or defining of control instructions based on a domain concept specific query.

One embodiment provides a computer program product for performing a method as described herein.

One embodiment provides a non-transitory carrier medium for carrying computer executable code that, when executed on a processor, causes the processor to perform a method as described herein.

One embodiment provides a system configured for performing a method as described herein.

Reference throughout this specification to "one embodiment", "some embodiments" or "an embodiment" means that a particular feature, structure or characteristic described in connection with the embodiment is included in at least one embodiment of the present invention. Thus, appearances of the phrases "in one embodiment", "in some embodiments" or "in an embodiment" in various places throughout this specification are not necessarily all referring to the same embodiment, but may. Furthermore, the particular features, structures or characteristics may be combined in any suitable manner, as would be apparent to one of ordinary skill in the art from this disclosure, in one or more embodiments.

As used herein, unless otherwise specified the use of the ordinal adjectives "first", "second", "third", etc., to describe a common object, merely indicate that different instances of like objects are being referred to, and are not intended to imply that the objects so described must be in a given sequence, either temporally, spatially, in ranking, or in any other manner.

In the claims below and the description herein, any one of the terms comprising, comprised of or which comprises is an open term that means including at least the elements/features that follow, but not excluding others. Thus, the term comprising, when used in the claims, should not be interpreted as being limitative to the means or elements or steps listed thereafter. For example, the scope of the expression a device comprising A and B should not be limited to devices consisting only of elements A and B. Any one of the terms including or which includes or that includes as used herein is also an open term that also means including at least the elements/features that follow the term, but not excluding others. Thus, including is synonymous with and means comprising.

As used herein, the term "exemplary" is used in the sense of providing examples, as opposed to indicating quality. That is, an "exemplary embodiment" is an embodiment provided as an example, as opposed to necessarily being an embodiment of exemplary quality.

BRIEF DESCRIPTION OF THE DRAWINGS

Embodiments of the invention will now be described, by way of example only, with reference to the accompanying drawings in which.

DETAILED DESCRIPTION

Figure 1A:
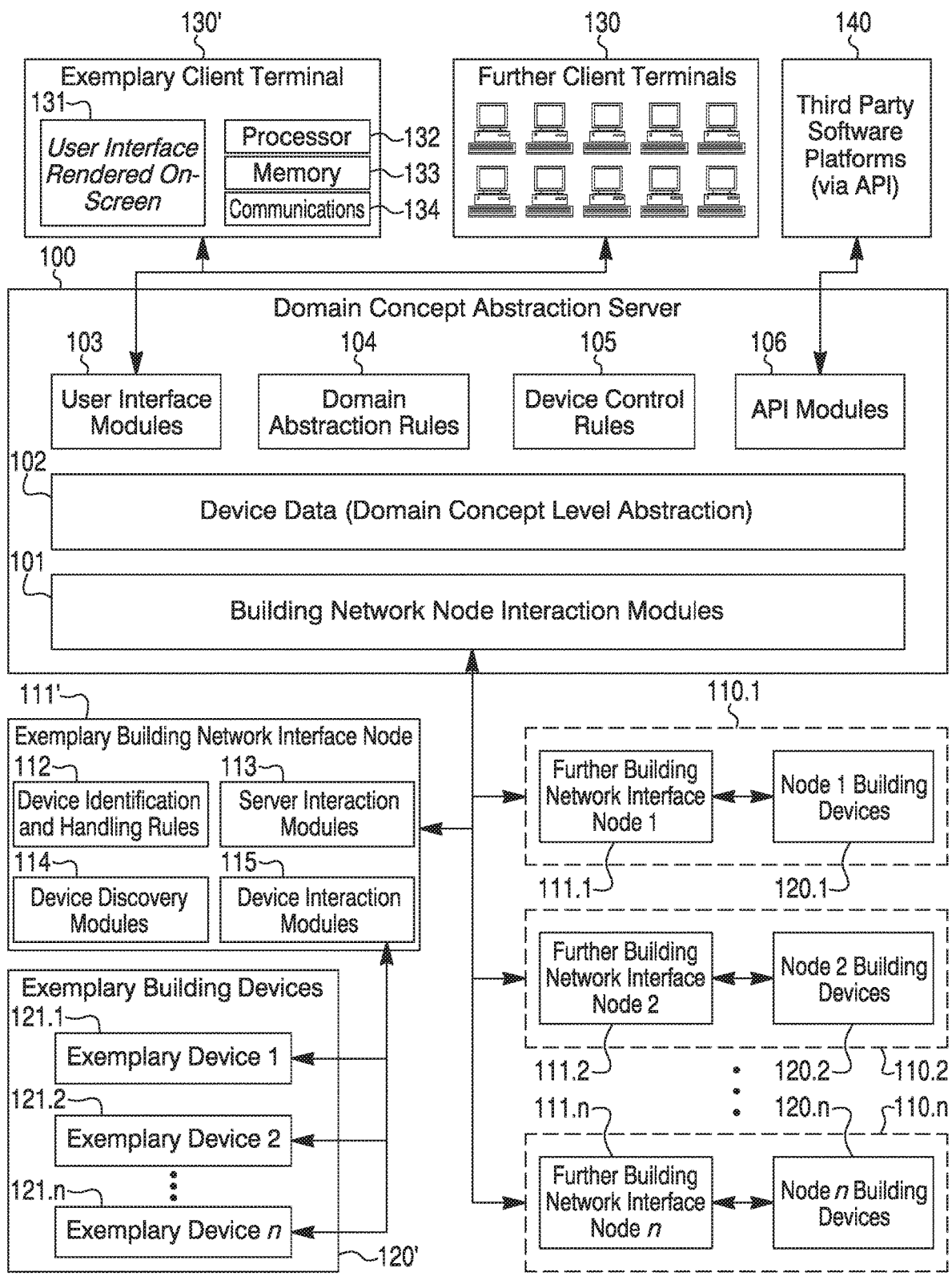
FIG. 1A schematically illustrates a framework according to one embodiment.

The present invention relates to frameworks and methodologies configured to provide access to building devices via domain concept abstraction. Embodiments of the invention have been particularly developed to allow simplified centralised access to a wide range of building devices based on domain concept abstraction, hence isolating end users (and applications) from details as to specific attributes of individual building-level hardware devices. While some embodiments will be described herein with particular reference to that application, it will be appreciated that the invention is not limited to such a field of use, and is applicable in broader contexts.

Various embodiments include computer implemented methods for providing building management functionalities. For example, this includes providing access to data derived from building devices, and/or enabling the control of such devices. The methods include receiving, at a server device, data from a plurality of building network interface nodes. One or more building interface nodes are installed at each site (for example a site may be defined by a building). The building interface nodes are configured to discover and connect to a range of building devices on a network; protocols for discovery and/or control are able to be updated from a central source thereby to enable each node to accommodate an every-growing set of building device hardware types.

Each building network interface node is: (i) connected to a respective network that includes one or more building devices, each device being configured to output point value data and/or accept control instructions; (ii) configured to identify the connected one or more building devices; (iii) configured to upload to the server point identity data for each of the one of the building devices; (iv) configured to upload to the server point value data from at least one of the building devices; and (v) configured to provide to at least one of the building devices a control instruction received from the server.

The server is configured to, for each of the building devices, define a respective data set. For each given device, the data set includes device attributes that associate the device to one or more domain concepts. For instance, the domain concepts provide descriptive device categorisations at various levels of abstraction. A basic example is a domain concept of "door controllers"; a range of different devices (from multiple manufacturers) will have very different hardware configurations, provide different forms of point data, and be controlled in different ways. However, as an abstracted domain concept, they are all "door controllers".

The server provides an interface that enables access to point value data based on a domain concept specific query and/or defining of control instructions based on a domain concept specific query. So, for example, a user may submit a query that is restricted to "door controllers", thereby to access information regarding all door controllers at one or more sites (and/or control door controllers at those sites, subject to authentication/authorisation for such control).

In a preferred embodiment, the domain concepts are defined thereby to represent one or more of: doors; lighting controllers; air handling units; and surveillance cameras. It will be appreciated that this is an indicative selection only.

For each building device, the data set provided at the server is configured to maintain normalised point value data based on the domain concept. This, in some embodiments, includes applying a protocol that enables translation of hardware-specific data (for each of an expandable range of known hardware devices) to a domain concept specific normalised data. This includes point data, and in some embodiments control data (i.e. data that provides access to device control). In this manner, for a set of building devices defined by different hardware but associated with a common domain concept, a user is able to access a standardised interface that enables accessing of data values, and in some cases control. The interface provides access to the normalised point value data (and, where available, control data).

In some embodiments each of the network interface nodes is configured to upload, to the server, alarm event data from at least one of the building devices, wherein for a given device the data set includes the alarm event data. The interface provides access to the alarm event data based on a domain concept specific query. In this manner, alarms are able to be readily translated to the domain concept abstracted level, such that they are readily available to apps, user interfaces, and so on.

In some embodiments each of the network interface nodes is configured to upload to the server device configuration data from at least one of the building devices, wherein for a given device the data set includes device configuration data. For example, the configuration data is representative of operational parameters upon which the device is currently operating. The interface provides access to the device configuration data based on a domain concept specific query. Preferably device configuration data is normalised for the domain concept abstraction level, such that consistent configuration data value types are defined for all devices belonging to each domain concept. For example, this enables a query such as "show which AHUs are set to provide Output X" to be executed, independent of specific data formats by which Output X is conveyed in point value data obtained by the physical site AHU devices.

In the context of control data, the methods include receiving via the interface data indicative of a control instruction that is to be applied to one or more of the building devices. For each of those building devices, a command format is identified, for a given one of the devices being a command format in which that device accepts control instructions. The method then includes, for each of the building devices, defining a device-specific control instruction in the command format in which that device accepts control instructions; and providing signals to the one or more of the network interface nodes thereby to cause implementation of the device-specific control instructions. In this manner, control instructions are able to be provided at a level of abstraction corresponding to the domain concepts, and delivered on a hardware specific basis. This isolates individual users from nuances of hardware device control.

The interface provides an API, thereby to enable third party software applications to gain access to point value data based on a domain concept specific query, and in some embodiments additionally provides functionality to define control instructions based on a domain concept specific query. This, in effect, opens up a framework whereby third party software developers are able to provide BMS style functionalities via respective apps, using the API and data/control functionalities made available by the server. It will be appreciated that this is significant in the sense that the apps are designed to interact with normalised data and control provided via domain concept abstraction. That is, third party developers need only learn data point and control protocols at the domain concept abstracted level, and need not be concerned with specifics of client-site hardware devices (allowing the apps to operate across a range of client sites that have installed compatible network node interfaces).

In some embodiments the filters data (and/or control) availability based on characteristics of a client. For example, each network node is configured to include identification data, and the server is configured to restrict access to point data and/or device control based on that identification data. For example, authorisation/authentication rules are associated with the identification data, such that only client terminals that provide appropriate authorisation/authentication credentials are able to access the point data and/or device control for a given network interface node, based on that identification data and associated authorisation/authentication rules.

It will be appreciated that a primary focus of authorisation/authentication rules is to restrict access to devices belonging to a given site to those client devices operated by users responsible for that site. However, in some embodiments certain point data is made available to a wider group. Specifically, for a set of clients having predefined attributes, limited access is provided to point value data across a plurality of sites, without revealing location or ownership details for the related building devices. For example, various forms of de-personalised point value data is made available based on a domain concept specific query. This enables monitoring and analysis of device operation and/or behaviour across a wide information base. This is optionally used to enable development of optimisation strategies, energy management, app functionalities, and the like, based upon this broader base of knowledge.

FIG. 1A illustrates a framework according to one embodiment. In this embodiment, a domain concept abstraction server 100 is configured to communicate with a plurality of building interface nodes, including an exemplary building interface node 111', and a plurality of further building interface nodes 111.1 to 111.n, which are distributed across a plurality of control networks 110.1 to 110.n. These control networks may be geographically distributed (for example at different buildings).

Each building interface nodes is associated with a set of building devices, which it autonomously discovers on its respective control network. Exemplary building interface node 111' discovers, on its control network, exemplary devices 120', which include exemplary devices 121.1 to 121.n. Further building interface nodes 111.1 to 111.n connect to and discover devices 120.1 to 120.n. A building device is, in this embodiment, defined as any TCP/IP enabled intelligent building node ranging from a simple sensor through to PC/server based BMS system.

Exemplary building interface network device 111' includes device identification and handling rules 112. These are periodically updated based on downloads from a server, thereby to enable device 111' to interact (for example discover, extract point data, and control) an expandable set of building devices. Device discover modules 114 are configured to discover building devices on a control network, and identify those devices based on rules 112. Device interaction modules 115 are configured to handle the input of data obtained/received from building devices, and transmission of signals to building devices. In some embodiments this includes performing translations in data formats based on rules 112. For example, in some embodiments commands are provided to node 111' at a domain concept level of abstraction, and node 111' is responsible for translating commands into device/hardware specific signals based on rules 112. However, in other embodiments such translations are handled centrally at server 100.

Server interaction modules 113 enable communication between server 111' and a building network node interaction modules 101 provided by server 101. For example, modules 113 are responsible for implementing node-server communication protocols, which include an identification/handshake process which enables node 111' to uniquely identify itself to server 100. In some embodiments modules 113 are additionally configured to implement a data synchronisation protocol such that predefined changes in data maintained at server 100 are automatically applied at server 111'.

Server 100 includes domain abstraction rules modules and device control rules 105. These are in some embodiments provided as an alternative to rules 112, where domain concept abstraction is performed centrally as opposed to being performed at the building interface nodes. In some embodiments the abstraction of point value data is performed in part at the building interface nodes and in part at server 100. The same applies to downstream control commands: these are provided at a domain concept abstracted level (i.e. a user or app provides a command that is directed to all devices belonging to a given domain concept, independent of the nature of the devices involved), and converted into device-appropriate signals by processing performed at the server, the network interface nodes, or a combination of the server and the building interface nodes.

Server 102 maintains device data 102, with this data being stored with domain concept level abstraction. That is, as foreshadowed above:

Building devices 120.1 to 120.n are each configured to output point value data onto a control network. For each device, the nature/format of the outputted point value data is device specific (for example based on the precise hardware/firmware/software of that device).

Building interface nodes 111.1 to 111.n discover the respective building devices 120.1 to 120.n on the relevant control networks.

Based on processing at the interface nodes, and/or at server 100, each building device is associated with one or more domain concepts. Based on data stored in a repository of device protocols, format and nature of point value data is normalised for devices belonging to a common domain concept. This normalised data is stored as data 102.

Normalisation of device-specific point value data based on identified domain concepts to provide data stored with domain concept level abstraction enables users (for example via third party apps) to conveniently query and access meaningful point vale data based on domain concept specific queries.

As noted, each building device is associated with "one or more" domain concepts. That is, some devices may be associated with multiple domain concepts. In some embodiments, the point value data for such a device is differentially normalised for each domain concept. That is, for a Device A that is associated with Domain Concept B and Domain Concept C, in some embodiments a first set of normalised point value data is defined for Domain Concept B and a second set of normalised point value data is defined for Domain Concept C.

Data 102 enables collection and storing of large amounts of building information including, but not limited to point value history, alarm/event history, building model and configuration data. This is, by the framework discussed herein, inherently scalable to span multiple sites, and hence enable analysis both on a site-by-site basis (for example by site managers), and across multiple (potentially unrelated) sites based on domain concepts (for example to enable analysis and/or optimisation of based on a broader information base).

In the example of FIG. 1A, a plurality of client terminals, including an exemplary client terminal 130' and a plurality of further client terminals 130, interact with server 100 via user interface modules 103. Exemplary client terminal 130' includes a communications module 134 (for example WiFi, Ethernet, or the like), coupled to a microprocessor 132 and memory 133. Memory 133 maintains software instructions that, when executed via the microprocessor, enables the rendering us a user interface on a display screen 131. The user interface may be rendered via a proprietary app (in which case substantive user interface data is stored in local memory) or via a web browser arrangement (in which case substantive user interface data is downloaded from a web server for rendering in a web browser executed from locally stored software instructions).

Third party software platforms 140 communicate with server 100 via API modules 106. This enables application development environments to access information from any connected building or device. The applications themselves in some cases remain of the physical location and connection details of any building device; the API allows applications to be productively developed against domain concepts (e.g. AHU's, doors) rather than low level automation/control concepts (e.g. Points, Parameters).

Figure 1B:
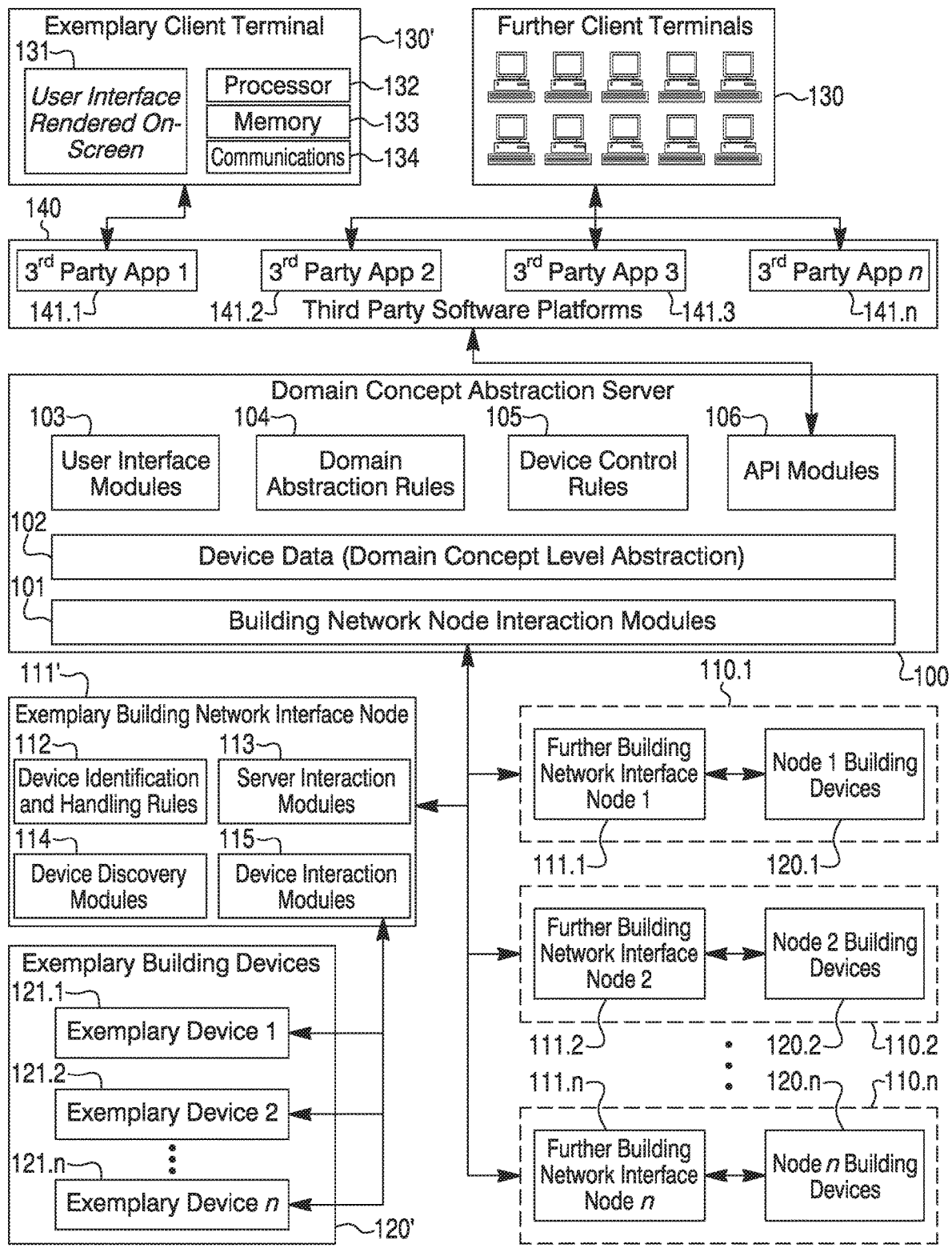
FIG. 1B schematically illustrates a framework according to one embodiment.

In the alternate framework of FIG. 1B, client terminals 130 and 130' interact with server 100 via a plurality of third party software platforms 141.1 to 141.n, which each interact with API modules 108.

Figure 2A:
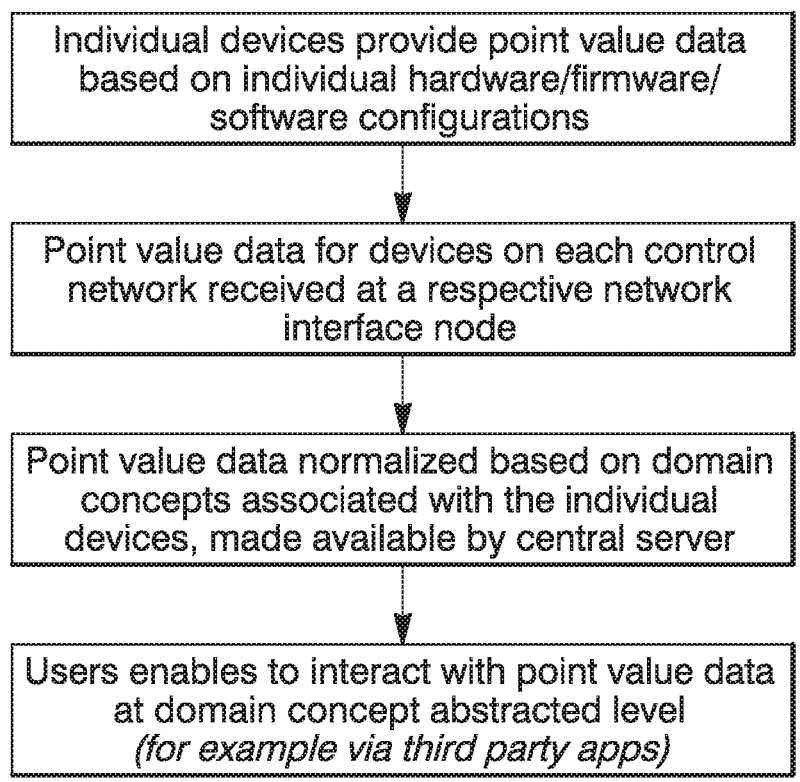
FIG. 2A illustrates a method according to one embodiment.

FIG. 2A illustrates an exemplary method by which point values from devices are passed to a domain concept abstracted level for accessing by clients and third party apps.

Figure 2B:
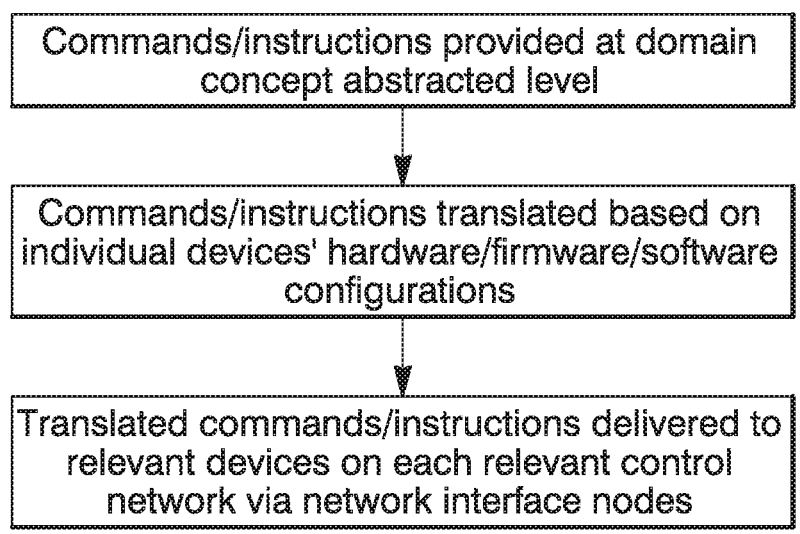
FIG. 2B illustrates a method according to one embodiment.

FIG. 2B illustrates an exemplary method by which commands/instructions are provided at the domain concept abstracted level, and translated for delivery to individual devices.

Conclusions and Interpretation

Unless specifically stated otherwise, as apparent from the following discussions, it is appreciated that throughout the specification discussions utilizing terms such as "processing," "computing," "calculating," "determining", analyzing" or the like, refer to the action and/or processes of a computer or computing system, or similar electronic computing device, that manipulate and/or transform data represented as physical, such as electronic, quantities into other data similarly represented as physical quantities.

In a similar manner, the term "processor" may refer to any device or portion of a device that processes electronic data, e.g., from registers and/or memory to transform that electronic data into other electronic data that, e.g., may be stored in registers and/or memory. A "computer" or a "computing machine" or a "computing platform" may include one or more processors.

The methodologies described herein are, in one embodiment, performable by one or more processors that accept computer-readable (also called machine-readable) code containing a set of instructions that when executed by one or more of the processors carry out at least one of the methods described herein. Any processor capable of executing a set of instructions (sequential or otherwise) that specify actions to be taken are included. Thus, one example is a typical processing system that includes one or more processors. Each processor may include one or more of a CPU, a graphics processing unit, and a programmable DSP unit. The processing system further may include a memory subsystem including main RAM and/or a static RAM, and/or ROM. A bus subsystem may be included for communicating between the components. The processing system further may be a distributed processing system with processors coupled by a network. If the processing system requires a display, such a display may be included, e.g., a liquid crystal display (LCD) or a cathode ray tube (CRT) display. If manual data entry is required, the processing system also includes an input device such as one or more of an alphanumeric input unit such as a keyboard, a pointing control device such as a mouse, and so forth. The term memory unit as used herein, if clear from the context and unless explicitly stated otherwise, also encompasses a storage system such as a disk drive unit. The processing system in some configurations may include a sound output device, and a network interface device. The memory subsystem thus includes a computer-readable carrier medium that carries computer-readable code (e.g., software) including a set of instructions to cause performing, when executed by one or more processors, one of more of the methods described herein. Note that when the method includes several elements, e.g., several steps, no ordering of such elements is implied, unless specifically stated. The software may reside in the hard disk, or may also reside, completely or at least partially, within the RAM and/or within the processor during execution thereof by the computer system. Thus, the memory and the processor also constitute computer-readable carrier medium carrying computer-readable code.

Furthermore, a computer-readable carrier medium may form, or be included in a computer program product.

In alternative embodiments, the one or more processors operate as a standalone device or may be connected, e.g., networked to other processor(s), in a networked deployment, the one or more processors may operate in the capacity of a server or a user machine in server-user network environment, or as a peer machine in a peer-to-peer or distributed network environment. The one or more processors may form a personal computer (PC), a tablet PC, a set-top box (STB), a Personal Digital Assistant (PDA), a cellular telephone, a web appliance, a network router, switch or bridge, or any machine capable of executing a set of instructions (sequential or otherwise) that specify actions to be taken by that machine.

Note that while diagrams only show a single processor and a single memory that carries the computer-readable code, those in the art will understand that many of the components described above are included, but not explicitly shown or described in order not to obscure the inventive aspect. For example, while only a single machine is illustrated, the term "machine" shall also be taken to include any collection of machines that individually or jointly execute a set (or multiple sets) of instructions to perform any one or more of the methodologies discussed herein.

Thus, one embodiment of each of the methods described herein is in the form of a computer-readable carrier medium carrying a set of instructions, e.g., a computer program that is for execution on one or more processors, e.g., one or more processors that are part of web server arrangement. Thus, as will be appreciated by those skilled in the art, embodiments of the present invention may be embodied as a method, an apparatus such as a special purpose apparatus, an apparatus such as a data processing system, or a computer-readable carrier medium, e.g., a computer program product. The computer-readable carrier medium carries computer readable code including a set of instructions that when executed on one or more processors cause the processor or processors to implement a method. Accordingly, aspects of the present invention may take the form of a method, an entirely hardware embodiment, an entirely software embodiment or an embodiment combining software and hardware aspects. Furthermore, the present invention may take the form of carrier medium (e.g., a computer program product on a computer-readable storage medium) carrying computer-readable program code embodied in the medium.

The software may further be transmitted or received over a network via a network interface device. While the carrier medium is shown in an exemplary embodiment to be a single medium, the term "carrier medium" should be taken to include a single medium or multiple media (e.g., a centralized or distributed database, and/or associated caches and servers) that store the one or more sets of instructions. The term "carrier medium" shall also be taken to include any medium that is capable of storing, encoding or carrying a set of instructions for execution by one or more of the processors and that cause the one or more processors to perform any one or more of the methodologies of the present invention. A carrier medium may take many forms, including but not limited to, non-volatile media, volatile media, and transmission media. Non-volatile media includes, for example, optical, magnetic disks, and magneto-optical disks. Volatile media includes dynamic memory, such as main memory. Transmission media includes coaxial cables, copper wire and fiber optics, including the wires that comprise a bus subsystem. Transmission media also may also take the form of acoustic or light waves, such as those generated during radio wave and infrared data communications. For example, the term "carrier medium" shall accordingly be taken to included, but not be limited to, solid-state memories, a computer product embodied in optical and magnetic media; a medium bearing a propagated signal detectable by at least one processor of one or more processors and representing a set of instructions that, when executed, implement a method; and a transmission medium in a network bearing a propagated signal detectable by at least one processor of the one or more processors and representing the set of instructions.

It will be understood that the steps of methods discussed are performed in one embodiment by an appropriate processor (or processors) of a processing (i.e., computer) system executing instructions (computer-readable code) stored in storage. It will also be understood that the invention is not limited to any particular implementation or programming technique and that the invention may be implemented using any appropriate techniques for implementing the functionality described herein. The invention is not limited to any particular programming language or operating system.

It should be appreciated that in the above description of exemplary embodiments of the invention, various features of the invention are sometimes grouped together in a single embodiment, FIG., or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the Detailed Description are hereby expressly incorporated into this Detailed Description, with each claim standing on its own as a separate embodiment of this invention.

Furthermore, while some embodiments described herein include some but not other features included in other embodiments, combinations of features of different embodiments are meant to be within the scope of the invention, and form different embodiments, as would be understood by those skilled in the art. For example, in the following claims, any of the claimed embodiments can be used in any combination.

Furthermore, some of the embodiments are described herein as a method or combination of elements of a method that can be implemented by a processor of a computer system or by other means of carrying out the function. Thus, a processor with the necessary instructions for carrying out such a method or element of a method forms a means for carrying out the method or element of a method. Furthermore, an element described herein of an apparatus embodiment is an example of a means for carrying out the function performed by the element for the purpose of carrying out the invention.

In the description provided herein, numerous specific details are set forth. However, it is understood that embodiments of the invention may be practiced without these specific details. In other instances, well-known methods, structures and techniques have not been shown in detail in order not to obscure an understanding of this description.

Similarly, it is to be noticed that the term coupled, when used in the claims, should not be interpreted as being limited to direct connections only. The terms "coupled" and "connected," along with their derivatives, may be used. It should be understood that these terms are not intended as synonyms for each other. Thus, the scope of the expression a device A coupled to a device B should not be limited to devices or systems wherein an output of device A is directly connected to an input of device B. It means that there exists a path between an output of A and an input of B which may be a path including other devices or means. "Coupled" may mean that two or more elements are either in direct physical or electrical contact, or that two or more elements are not in direct contact with each other but yet still co-operate or interact with each other.

Thus, while there has been described what are believed to be the preferred embodiments of the invention, those skilled in the art will recognize that other and further modifications may be made thereto without departing from the spirit of the invention, and it is intended to claim all such changes and modifications as falling within the scope of the invention. For example, any formulas given above are merely representative of procedures that may be used. Functionality may be added or deleted from the block diagrams and operations may be interchanged among functional blocks. Steps may be added or deleted to methods described within the scope of the present invention.

The invention claimed is:

1. A computer implemented method for providing building management functionalities, the method comprising:
   receiving, at a server device, data from a plurality of building network interface nodes, wherein each building network interface node is:
   connected to a respective network that includes one or more building devices, each building device being configured to at least output point value data or accept control instructions;
   configured to identify the connected one or more building devices;
   configured to upload to the server device point identity data for each of the one or more of the building devices;
   configured to upload to the server device point value data from at least one of the building devices; and
   configured to provide to at least one of the building devices a control instruction received from the server device;
   defining a plurality of domain concepts wherein the domain concepts provide descriptive device categorizations at various levels of abstraction;
   for each of the building devices, defining a respective data set, wherein for a given device the data set includes device attributes that associate the device to one or more of the plurality of defined domain concepts;
   providing an interface that at least enables access to point value data based on a domain concept specific query or define control instructions based on a domain concept specific query
   wherein each building network interface node is further configured to:
   for at least one of the building devices, translate hardware-specific data to domain concept specific normalised data and upload the normalised data to the server; and
   for at least one of the building devices, identify a command format in which that building device accepts control instructions and translate commands provided at a domain concept level of abstraction into hardware specific signals for that building device.

2. A method according to claim 1 wherein the plurality of building network interface nodes are located across a plurality of geographically separated buildings.

3. A method according to claim 1 wherein the domain concepts are defined thereby to represent one or more of: doors; lighting controllers; air handling units; and surveillance cameras.

4. A method according to claim 1 wherein the data set is configured to maintain normalised point value data for a set of building devices defined by different hardware but associated with a common domain concept.

5. A method according to claim 4 wherein the interface provides access to the normalised point value data.

6. A method according to claim 1 including: receiving via the interface data indicative of a control instruction that is to be applied to one or more of the building devices; for each of the building devices identifying a command format in which that building device accepts control instructions; for each of the building devices defining a device-specific control instruction in the command format in which that building device accepts control instructions; and providing signals to the one or more of the building devices thereby to cause implementation of the device-specific control instructions.

7. A method according to claim 1 wherein the interface provides an API, thereby to enable third party software applications to gain access to point value data based on a domain concept specific query and/or function.

8. A method according to claim 1 wherein the interface filters data availability based on characteristics of a client, and wherein for a set of clients having predefined attributes access is provided to point value data without revealing location or ownership details for the related building devices.

9. A method according to claim 1 wherein each of the network interface nodes is configured to upload to the server device alarm event data from at least one of the building devices, wherein for a given device the data set includes the alarm event data, and wherein the interface provides access to the alarm event data based on a domain concept specific query.

10. A method according to claim 1 wherein each of the network interface nodes is configured to upload to the server device configuration data from at least one of the building devices, wherein for a given device the data set includes device configuration data, and wherein the interface provides access to the device configuration data based on a domain concept specific query.

11. A network interface node device comprising:
    a network module that is configured to connect to a control network, wherein the device is configured to identify, on the control network, one or more connected building devices wherein for each of the building devices, a respective data set is defined, wherein for a given device the defined data set includes device attributes that associate the device to one or more of a plurality of defined domain concepts wherein the domain concepts provide descriptive device categorizations at various levels of abstraction and the device is configured to at least output point value data or accept control instructions;
    wherein the device is further configured to, for at least one of the building devices, translate hardware-specific data to domain concept specific normalised data and output the normalised data, and for at least one of the building devices identify a command format in which that building device accepts control instructions and translate commands provided at a domain concept level of abstraction into hardware specific signals for that building device; and
    a processor that is configured to process the point value data, thereby to enable a server device to make domain concept level normalised point value data available via an interface, wherein the interface that at least enables access to point value data based on a domain concept specific query or define control instructions based on a domain concept specific query.

* * * * *